United States Patent [19]

Miller

[11] Patent Number: 5,569,927
[45] Date of Patent: *Oct. 29, 1996

[54] COMPOSITE MATERIAL DOSIMETERS

[75] Inventor: Steven D. Miller, Richland, Wash.

[73] Assignee: Battelle Memorial Institute, Richland, Wash.

[*] Notice: The term of this patent shall not extend beyond the expiration date of Pat. No. 5,028,794.

[21] Appl. No.: 534,769

[22] Filed: Sep. 27, 1995

Related U.S. Application Data

[62] Division of Ser. No. 253,888, Jun. 3, 1994, abandoned.

[51] Int. Cl.$^6$ ........................................ G01T 1/10
[52] U.S. Cl. ............................................ 250/484.5
[58] Field of Search ................................. 250/484.5

[56] References Cited

U.S. PATENT DOCUMENTS 5,028,794   7/1991   Miller ..................... 250/484.5

*Primary Examiner*—Carolyn E. Fields
*Attorney, Agent, or Firm*—Douglas E. McKinley, Jr.

[57] ABSTRACT

The present invention is a composite material containing a mix of dosimeter material powder and a polymer powder wherein the polymer is transparent to the photon emission of the dosimeter material powder. By mixing dosimeter material powder with polymer powder, less dosimeter material is needed compared to a monolithic dosimeter material chip. Interrogation is done with excitation by visible light.

5 Claims, 5 Drawing Sheets

COMPOSITE MATERIAL DOSIMETERS

This patent application is a division of application Ser. No. 08/253,888, filed Jun. 03, 1994, now abandoned.

FIELD OF THE INVENTION

The present invention relates generally to a composite material for use as a dosimeter, including but not limited to personnel dosimeters, environmental dosimeters, and high dose dosimeters. More specifically the invention is the incorporation of a dosimeter material powder into a polymer powder with subsequent formation of composite material dosimeters.

In this patent, the term dosimeter is used to indicate a device that incorporates dosimeter material that absorbs radiation and is subsequently interrogated for indication of radiation dose. In addition to the dosimeter material, the dosimeter may have additional material, for example, packaging or labelling that does not provide any indication of radiation dose.

BACKGROUND OF THE INVENTION

The present industrial standard personnel dosimeter is a plastic compartment containing a monolithic chip (approximately 3 mm×3 mm×1 mm) of a thermoluminescent crystalline material; for example, lithium fluoride doped with titanium and magnesium (LiF:Ti,Mg). Dosimeters contain one or more compartments with a corresponding thermoluminescent material chip in each compartment.

The compartments are used to facilitate handling of the tiny chips, reducing the risk of loss of a chip, and providing a sufficiently large surface upon which identifying information may be recorded.

The chips are normally interrogated after removing them from their compartments by a process referred to as ThermoLuminescent Dosimetry (TLD). The TLD process entails heating to a peak temperature then observing the light photons emitted as the temperature of the chips approaches the peak temperature. The number of photons are proportional to the level of radiation exposure. Of course, the chips themselves and any other material exposed to the peak temperatures must be able to withstand the peak temperatures. This requirement generally precludes the use of a composite dosimeter wherein the dosimeter chip material is held in a plastic matrix because most plastic matrices soften or degrade at the peak temperature.

Nevertheless, B. E. Bjarngard, R. C. McCall, and I. A. Berstein reported a composite dosimeter in their paper entitled LITHIUM FLUORIDE-TEFLON THERMOLUMINESCENCE DOSIMETERS, published Apr. 1967 in the Proceedings of International Conference on Luminescence Dosimetry, at Stanford University on Jun. 21–23, 1965. Teflon or Polytetrafluoroethylene (PTFE) is one of the few polymers that can withstand the peak temperature necessary to stimulate phosphorescence of the thermoluminescent dosimeter material. Bjarngard et al. report sensitivity of the composite dosimeter from about 50 mR. Sensitivity is likely limited by the opacity of the PTFE, and/or background signal from the PTFE. Although not tested, use of clear PTFE as is now used as a fiber optic sheath might improve sensitivity of this dosimeter. However, the present cost of the clear PTFE is prohibitive for industrial dosimeter applications.

In addition, R. Bernhardt et al. in their paper RADIATION DOSIMETRY BY OPTICALLY STIMULATED PHOSPHORESCENCE OF $CaF_2$:Mn, Aug. 1974 demonstrate optical stimulation of a $CaF_2$:Mn-Teflon (Teflon is a trade name for the chemical compound polytetrafluoroethylene) dosimeter for exposures from 1 to $10^5$ rad. The lower limit of 1 rad is reported as achievable using a measuring time of 0.5 min and a stimulation time of 0.1 min for a total time of 0.6 min. Shorter measuring times result in raising the lower limit, or reducing the sensitivity. The authors conclude that this dosimetric technique is appropriate for accident dosimetry.

A more recent method of interrogation was described in U.S. Pat. No. 4,954,707, to Miller et. al. entitled SYSTEM FOR USE WITH SOLID STATE DOSIMETER. In this patent, the method of interrogation is cooling of a solid state material chip and exposing the cooled chip to light for photoconversion of light sensitive traps, then permitting the chip to warm to ambient temperature wherein during the warming, photons are emitted from the light sensitive traps proportional to the level of radiation exposure. It is important to note that the photon emission occurs later in time than the photoconversion. This method is referred to as Cooled Optically Stimulated Luminescence (COSL). The COSL method is advantageous over the TLD method because the lower temperatures are less harmful to a wider variety of materials than the higher temperatures of the TLD process. The photoconversion in the COSL method as practiced using $CaF_2$:Mn or $CaF_2$:Dy is accomplished using ultraviolet (UV) light because the UV light produces the most photons per unit of ionizing radiation exposure thereby producing sensitivities on the order of about 1 milliRoentgen (mR).

A yet more recent method of interrogation was described in U.S. Pat. No. 5,272,348 to Miller, entitled METHOD FOR RADIATION DETECTION AND MEASUREMENT, wherein the dosimeter material is stimulated by light energy at one wavelength to produce photons at another wavelength at ambient temperatures. The emitted photons are proportional to the level of radiation exposure. This ambient temperature method is referred to as Optically Stimulated Luminescence (OSL). The OSL process has the advantage that no heating or cooling is necessary to obtain emitted photons. In the OSL process, photon emission occurs nearly simultaneously with light stimulation. The optical stimulation of the OSL process is practiced using light in the visible and infrared. It is preferred to use light at a wavelength that is near the excitation wavelength of the dosimeter material traps.

Regardless of the method of interrogation, however, the chips still required compartments for handling and interrogation independent of the compartment. The compartment plus chip cost along with the handling cost for interrogation made it prohibitive to perform large scale population dosimetry studies. Also, because of the cost of the chips, in industrial employee applications it was necessary to re-use the chips because the additional handling was less costly than replacement of the chips.

SUMMARY OF THE INVENTION

The present invention is based upon the discovery that certain plastic/dosimeter material combinations provide sufficient sensitivity that rapid readings (less than 10 sec) are possible and it is not necessary to remove the dosimeter material from the plastic for purposes of interrogation. Thus, a composite material containing a mix of dosimeter material powder and a polymer powder can be molded, extruded, or otherwise formed into dosimeters of various shapes. The polymer must be transparent to the photon emission of the dosimeter material powder. The dosimeter is useful for measuring radiation dose from ionizing radiation including but not limited to beta and gamma rays as well as non-ionizing short wave radiation, for example x-rays.

By mixing dosimeter material powder with polymer powder, less dosimeter material is needed compared to a monolithic dosimeter material chip. Moreover, the composite chip exhibits greater dosimeter-to-dosimeter uniformity compared to monolithic chip dosimeters. Thus, the composite dosimeter is sufficiently less costly that re-use is not necessary and overall cost of dosimetric interrogations is reduced.

Because interrogation by heating is generally done at temperatures in excess of softening or melting points of polymer materials, this invention is particularly suited for interrogation by non-heating methods. However, to avoid the loss of sensitivity due to high background signals from plastics exposed to ultraviolet light, it was discovered that optically transmissive sensitized metal oxides or alkali-metal halides provide sufficient photons when excited by a visible light, preferably a blue light, that they can be incorporated into a plastic or polymer matrix.

As used herein, the term optically transmissive includes a broad range of transmissivities from optically clear for the wavelengths of interest to optically translucent for the wavelengths of interest. Another term considered synonymous is non-opaque.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

The present invention is a dosimeter for measuring radiation exposure having an amount of an optically transmissive sensitized metal based bi-element compound powder dispersed throughout a volume of a polymer matrix.

Figure 1:
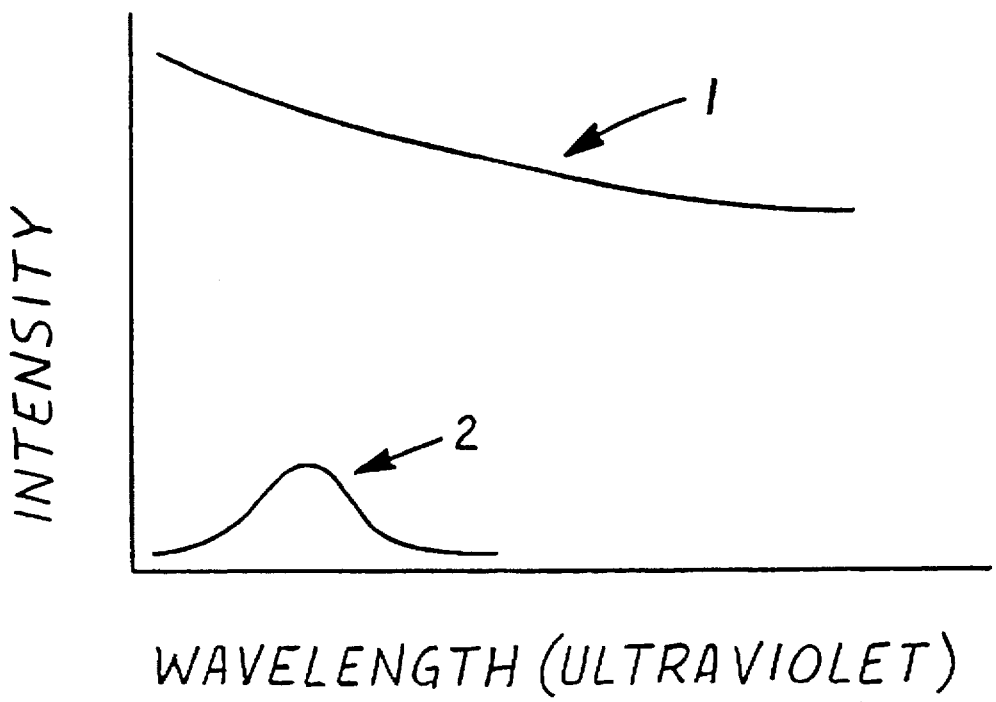
FIG. 1 is a graph of intensity versus wavelength for a range of ultraviolet wavelengths.
Figure 2:
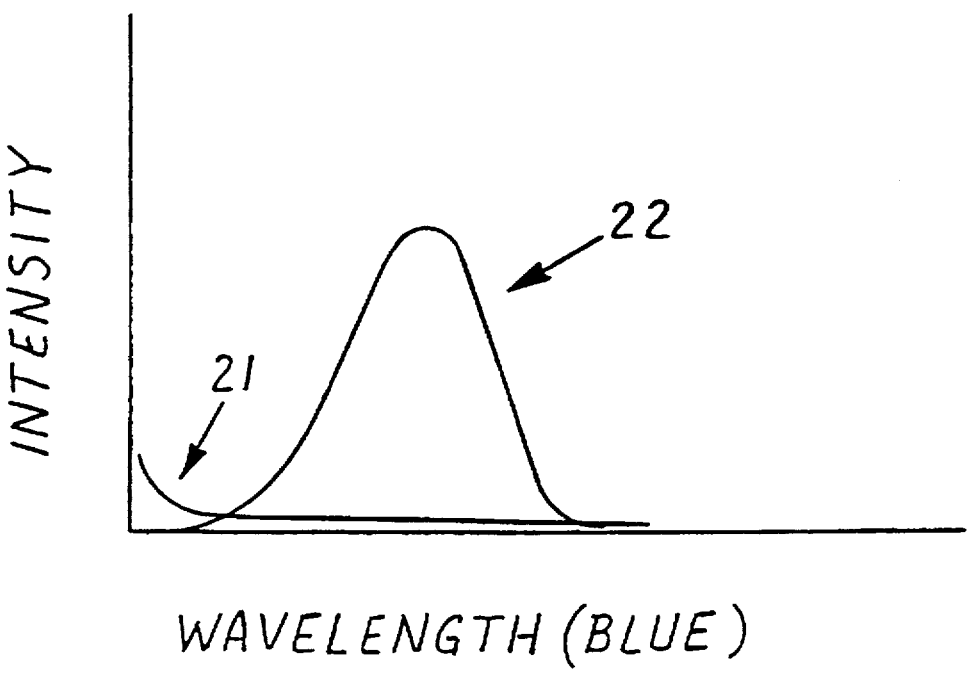
FIG. 2 is a graph of intensity versus wavelength for a range of violet to red optical wavelengths.

In order to achieve a dosimeter material/polymer matrix combination, the problem of polymer matrix background signal had to be overcome. FIG. 1 illustrates the problem. For a dosimeter material dispersed throughout a polymer matrix, when exposed to ultraviolet light, the first background signal 1 from the polymer matrix is so much more intense than the first peak signal 2 from the dosimeter material, that the combination is inoperative as a means or method of making measurements of radiation dose less than about 1 R of gamma radiation exposure as demonstrated by R. Bernhardt et al. (op. cit.). In FIG. 2, according to the present invention, exposure of a dosimeter of optically transmissive sensitized bi-element metal based compound dispersed in a polymer matrix, wherein the dosimeter is exposed to a light in the violet to red (350 nm to 700 nm), results in the second background signal 21 having much smaller intensity than the second peak signal 22 which is operative as a means and/or method of making sensitive measurements of radiation dose less than about 1 R of gamma radiation exposure, but more preferably less than about 10 mR of gamma radiation exposure.

The metal based compound is a bi-element compound wherein the term bi-element is defined as containing two chemical elements substantially stoichiometrically bonded together. The term substantially is used because there are occasionally excesses and deficiencies of one or the other element in a powder that are not strictly stoichiometric. There may be multiple atoms of one or both elements, but the compound still has the two chemical elements. The metal oxides are preferably selected from the group of zirconium oxide, barium oxide, strontium oxide, aluminum oxide and silicon oxide. Although there is debate as to whether silicon is a metal, it is included herein as a metal for purposes of definition of the metal based compound.

The metal based compound may be non-stoichiometrically doped with one or more additional element(s). Bi-element compounds are selected from the group of metal oxides and metal halides, or combinations thereof. Dopants may be any element(s) but are preferably selected from the group of manganese, dysproprium, titanium, magnesium, silicon and carbon.

The polymer matrix selected depends upon the method of interrogating the dosimeter material. When using the COSL method, there is time between photoconversion (resulting from photoexcitation) and photon emission (resulting from warming the dosimeter material). The time lag is controllable or selectable by keeping the dosimeter material at a low temperature until it is desired to obtain a reading. That time lag permits the use of a wide range of plastics because the background signal from the photoexcitation of the plastic decays as a function of time sooner than the photon emission decays from the dosimeter material. It is preferred that the plastic be optically transmissive to the photons released by the dosimeter material powder and optically transmissive to the photoconversion. Polymer matrices found to exhibit these characteristics include, for example, methyl-pentene (PTX), polyethylene, polypropylene, polycarbonate, polymethyl-methacrylate (PMMA) or Lucite, polystyrene, and most thermoset polymers. In addition to the time lag for the response of the dosimeter material, there is also a time lag for the response of the plastic matrix. Thus, for best readout sensitivity, it is best to permit the plastic matrix background signal to decay before reading the dosimeter material response. Additional improvement was discovered by using aluminum oxide as the dosimeter material. Aluminum oxide need only be cooled to dry ice temperatures compared to calcium fluoride that must be cooled to about liquid nitrogen temperatures. Use of the dry ice temperature permits the plastic matrix background signal to decay more quickly and requires less time to bring the dosimeter to room temperature. At liquid nitrogen temperatures, the time constant for the plastic background signal is on the order of hundreds of milliseconds whereas at room temperature, the plastic background signal time constant is from tens of nanoseconds to hundreds of nanoseconds. Use of warmer dry ice temperatures theoretically would affect sensitivity. In practice, it was discovered that if there is reduced sensitivity, it is within 10% of the liquid nitrogen temperature sensitivity.

When using OSL interrogation of alkali halide thermoluminescent materials, for example LiF and NaF, the light stimulation immediately produces emitted photons. Because both occur simultaneously, the background signal from the plastic induced by the light stimulation cannot be differentiated from the OSL emitted photons and therefore limits the potential sensitivity of the dosimeter. Nevertheless, it was discovered that stress relieved or cast PMMA has sufficiently low background that the emitted photons can be measured to sensitivities of ionizing radiation exposure below 100 R. Measurements may be made from about 10 R to about $10^7$ R. This range is useful for high dose dosimetry and for radiation sterilization carried out from about $10^3$ R to about $10^6$ R. For OSL, it is preferred to use metal halides, for example lithium fluoride and/or sodium fluoride.

Alternatively, it was discovered according to the present invention that aluminum oxide, specifically, has a decay time that is longer than the decay time of the plastic matrix for visible light and near visible light. Near visible light is in the ranges considered near infrared and near ultraviolet. For ultraviolet light, however, there was such a strong signal from the plastic, that it was not possible to make readings as sensitive as with light exposure substantially free of ultraviolet light. Thus, for a composite dosimeter of aluminum oxide in plastic, use of a room temperature pulsed laser readout permits the background signals from the plastic to decay to a low level before the signal from the aluminum oxide has decayed. In other words, by using visible light substantially free of ultraviolet light, the measurement of the aluminum oxide signal may be made substantially after decay of the background signal from the plastic matrix.

The sensitization of the metal based compound powders is presently uncharacterized. It was found that certain batches of similar compounds behaved very differently. For example, a batch of chromatography grade sapphire (aluminum oxide) did not provide sufficient photon signal for dosimetric performance whereas a batch of substrate grade sapphire polished crystals obtained from the Adolf-Meller Co. (now Meller Optics, Inc., Providence, R.I.) did provide sufficient photon signal for dosimetric performance. Although it is not yet known how to control the sensitization of a particular batch of a certain powder, sensitized batches are easily identified. Further, it is not yet known what the material parameters are that develop sensitization. One clue was the observation that the chromatography grade sapphire had a low anion deficiency concentration based upon measurements which exhibited essentially no photon emission whereas the commercial sapphire had an anion deficiency from about $10^{16}$ to about $10^{18}$ anion deficiencies per cubic centimeter. An anion deficiency is defined as a lattice defect wherein one or more oxygen atoms is/are missing. Anion deficiency is measured using optical absorption techniques wherein characteristic absorption occurs between from about 200 nm to about 260 nm in the ultraviolet. It is postulated that element or ion charge compensation may contribute to sensitization, but that is not certain.

Because both powders of metal oxides and metal halides can be interrogated using either COSL or OSL, the dosimeters are not limited to a particular interrogation method. In certain applications, it may be desirable to use one or the other depending upon required sensitivity of measurement or cost considerations. The COSL process is presently sensitive to as low as about 1 microR while the OSL process is presently sensitive to as low as about 1 mR without a plastic matrix. Addition of the plastic or polymer matrix provides a source of background signal that raises the lower limit from about 1 mR to from between above 1 mR to about 20 mR and most likely between about 10 mR and about 20 mR.

According to the present invention, it was discovered that aluminum oxide powder exhibits a long time constant phosphorescence at ambient temperatures (about 24° C.). Moreover, the photon emission of aluminum oxide at ambient temperatures was as intense or more intense than calcium fluoride doped with manganese. Thus, aluminum oxide is a preferred dosimeter powder.

The proportions of dosimeter material powder and polymer matrix material may vary according to a particular dosimetric application. According to the present invention, a ratio of dosimeter material powder to polymer matrix material may range from about 0.1% by weight to about 40% by weight. Below about 0.1% by weight, there is insufficient amount of dosimeter material to provide sufficient signal for making readings especially at low doses. Above about 40% by weight, the mechanical properties of the composite are reduced. A preferred range is from about 1% to about 10% by weight of dosimeter material and more preferred is a range from about 5% to about 10% by weight. In addition, the dosimeter material powder particle size distribution may vary as well. Dosimeter material particle size may range from about 1 micrometer to about 250 micrometers. Below from about 1 micrometer to about 10 micrometers, the dosimeter material exhibits a loss of ionizing radiation sensitivity. Above about 250 micrometers, it is difficult to achieve uniform dispersion in the polymer matrix. Thus, it is preferred that the dosimeter material particles are from about 40 micrometers to about 150 micrometers to provide good sensitivity and satisfactory mixing or dispersion within the polymer matrix. Ideally, the more individual particles homogeneously distributed throughout the polymer matrix, the better. That is because each powder particle acts as an individual dosimeter. However, because it is impossible to make the number of photon emission traps the same in each powder particle, it is necessary to have a statistically large number of powder particles in a dosimeter so that photon emission for a given radiation dose is consistent from dosimeter to dosimeter within acceptable limits. It is preferred to be consistent with a deviation of one standard deviation from the mean of about a 10%, and more preferred to be consistent within about 5%, and most preferred to be consistent within less than 5%. This makes it possible to achieve greater uniformity between dosimeters than is possible between monolithic chips of dosimeter material which exhibit a deviation from about 15% for LiF samples to greater than or equal to about 25% for unsorted $Al_2O_3$ single crystals samples.

By utilizing a polymer matrix, it is easier to form the dosimeter into a variety of shapes and sizes for example, finger rings or small discs. By using COSL or OSL, the interrogation is done without removing a chip of dosimeter material from the finger ring as is presently done using the TLD process. Moreover, it is easier to use presently available miniature marking technology to place identifying marks on a polymer matrix dosimeter so that chain of custody is maintained without the need for a separate container. This is important for increasing reliability of measurements should the detection element become separated from its container.

By using a composite of aluminum oxide in a polymer matrix in combination with a room temperature readout, there are two fundamental options for room temperature readout, one based upon a short time constant decay and another based upon a long time constant decay.

A preferred embodiment utilizes the long time constant decay in a two step process wherein a dosimeter is first exposed to a photoexcitation, then mechanically moved to a photomultiplier for readout of the dosimeter material photon emission. Advantages of the two-step process include avoiding exposure of the photomultiplier tube to an initial strong photon emission without electrical switching of the photomultiplier tube, and inexpensive light sources may be used. It will be apparent to those skilled in the art of dosimetry that the mechanical movement may be omitted. Any light source may be used, but it is preferred to use light sources substantially free of ultraviolet light. Examples of light sources include but are not limited to continuous or pulsed sources and laser and non-laser sources. It is preferred to utilize laser light sources because they are more easily adjusted to exclude ultraviolet light.

One way to utilize the short time constant decay option is with a fast pulsed laser with energy from about 1 to about 1000 mJoule per pulse. Alternatively, a shuttered continuous wave laser delivering from about 1 to about 1000 mjoule in an open shutter period wherein the open shutter period is approximately or about 1 ms may be used. A flash lamp or other pulsed or shuttered light source may be used instead of a laser.

METHOD OF MEASURING RADIATION DOSE

According to the present invention, a method of measuring radiation dose has the steps of:
  (a) exposing a dosimeter having a bi-element dosimeter material within a polymer matrix to radiation;
  (b) stimulating the irradiated dosimeter with visible light substantially free of ultraviolet light; and
  (c) counting photons emitted from the bi-element dosimeter material as a result of the light stimulation.

Ultraviolet light is light of wavelengths of less than about 326 nm. It is most preferred that the amount of ultraviolet light in the visible light used for interrogation be zero so that background noise from the polymer is minimized. However, in applications measuring moderate to high doses, or where low dose sensitivity is less important, a certain amount of ultraviolet light producing a corresponding background signal may be tolerable thereby permitting the use of a lamp or filtered lamp source.

The method can be carried out at room temperature or with a step of cooling the irradiated dosimeter to cryogenic temperatures prior to light stimulation.

In a preferred embodiment, the polymer has a visible light background signal decay time of less than a visible OSL light decay time of the bi-element material thereby permitting rapid readings. Preferably, readings are obtained in less than about 10 seconds, and more preferably less than about 5 seconds, and most preferably less than about 1 second.

Rapid readings are obtained by using a laser emitting in the near visible to visible range, preferably blue, to stimulate the dosimeter material to phosphorescence at a wavelength within the range from about 380 nm to about 500 nm. In applications wherein the stimulating wavelength is different from the response wavelength, an optical filter may be used to exclude scattered stimulation light from a photomultiplier tube used to count the response. In applications wherein the stimulating and emission wavelengths overlap, a short time constant laser excitation technique may be used with time gating to eliminate the scattered light from the excitation source. The laser may be a pulsed laser or a continuous wave laser.

In the method of the present invention, it is necessary that the stimulating light be substantially free of ultraviolet light.

EXAMPLE 1

An experiment was done to quantify the response versus wavelength behavior of sensitized aluminum oxide ($Al_2O_3$). Twenty one wavelengths between 300 nm and 700 nm were selected for the experiment. A combination of commercially available lasers and filtered light sources was used to provide excitation at the various wavelengths. At each wavelength, about ten excitations were done thereby permitting estimation of an error band about each data point. Each excitation transferred the same amount of energy independent of wavelength.

The COSL interrogation method was used to quantify the response of the aluminum oxide at each wavelength. Cooling was accomplished with liquid nitrogen and emitted photons were detected and counted by a photomultiplier tube model RCA 8575, RCA Burle, Mass.

Figure 3:
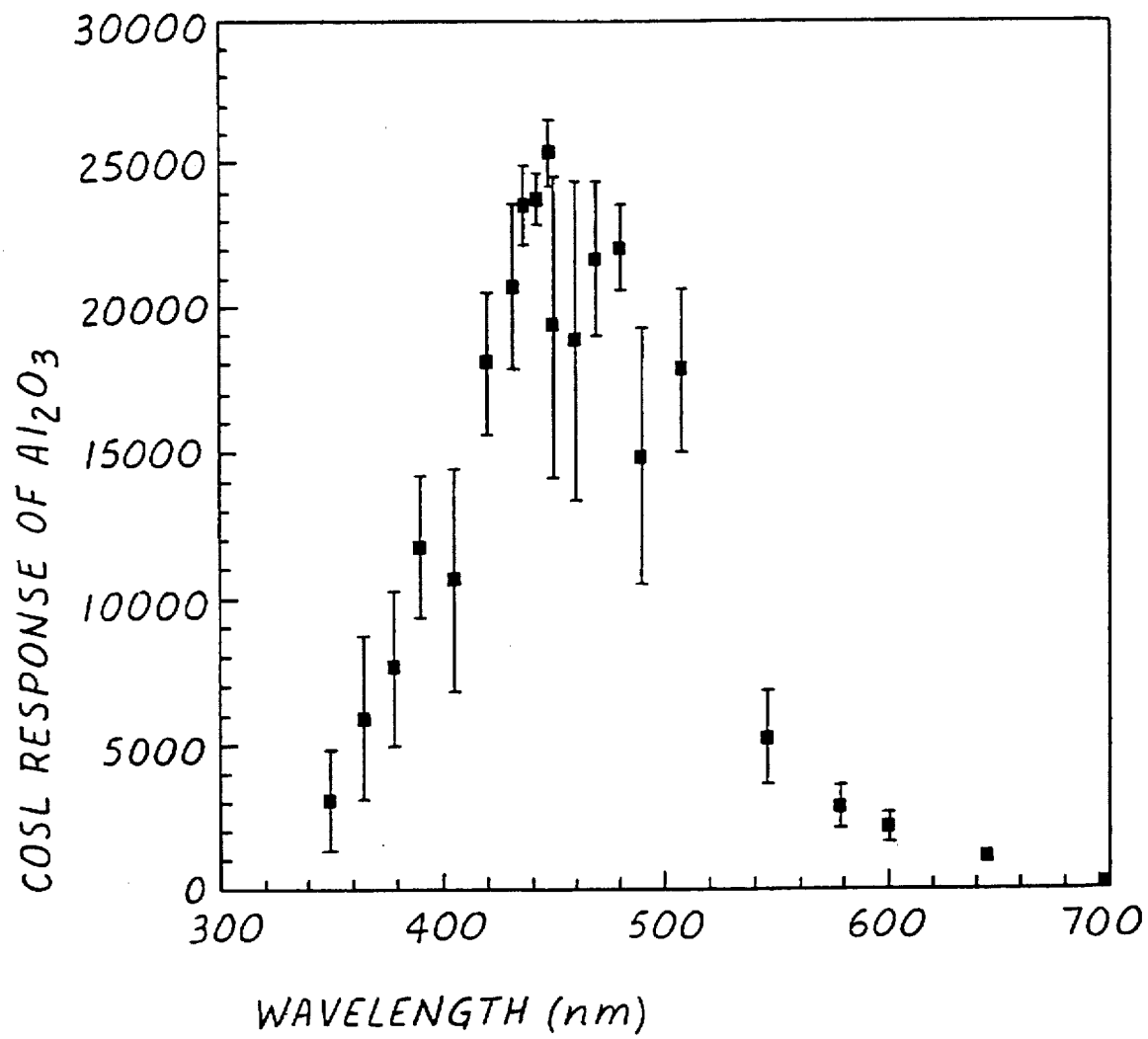
FIG. 3 is a graph of COSL Response of $Al_2O_3$ versus wavelength.

Results are shown in FIG. 3 confirming a sensitive response between about 400 nm and about 520 nm.

EXAMPLE 2

A second experiment was performed to quantify decay constants for sensitized aluminum oxide. For quantification of the fast decay (FIG. 4) data were obtained with a frequency doubled Nd:YAG laser operating at 532 nm (green) and generating 25 mJoule at 2 Hz. The pulse duration of the laser was about 10 ns. A narrow-band pass 420 nm filter was used with the photomultiplier tube of Example 1 to eliminate the 532 nm light. For quantification of the slow decay (FIG. 5) a 600 ps nitrogen dye laser manufactured by Laser Photonics, Orlando, Fla. was used to provide a burst of energy to the sensitized aluminum oxide at room temperature. The photomultiplier tube used in Example 1 was used in this example to count photon emission over time after the burst.

Figure 4:
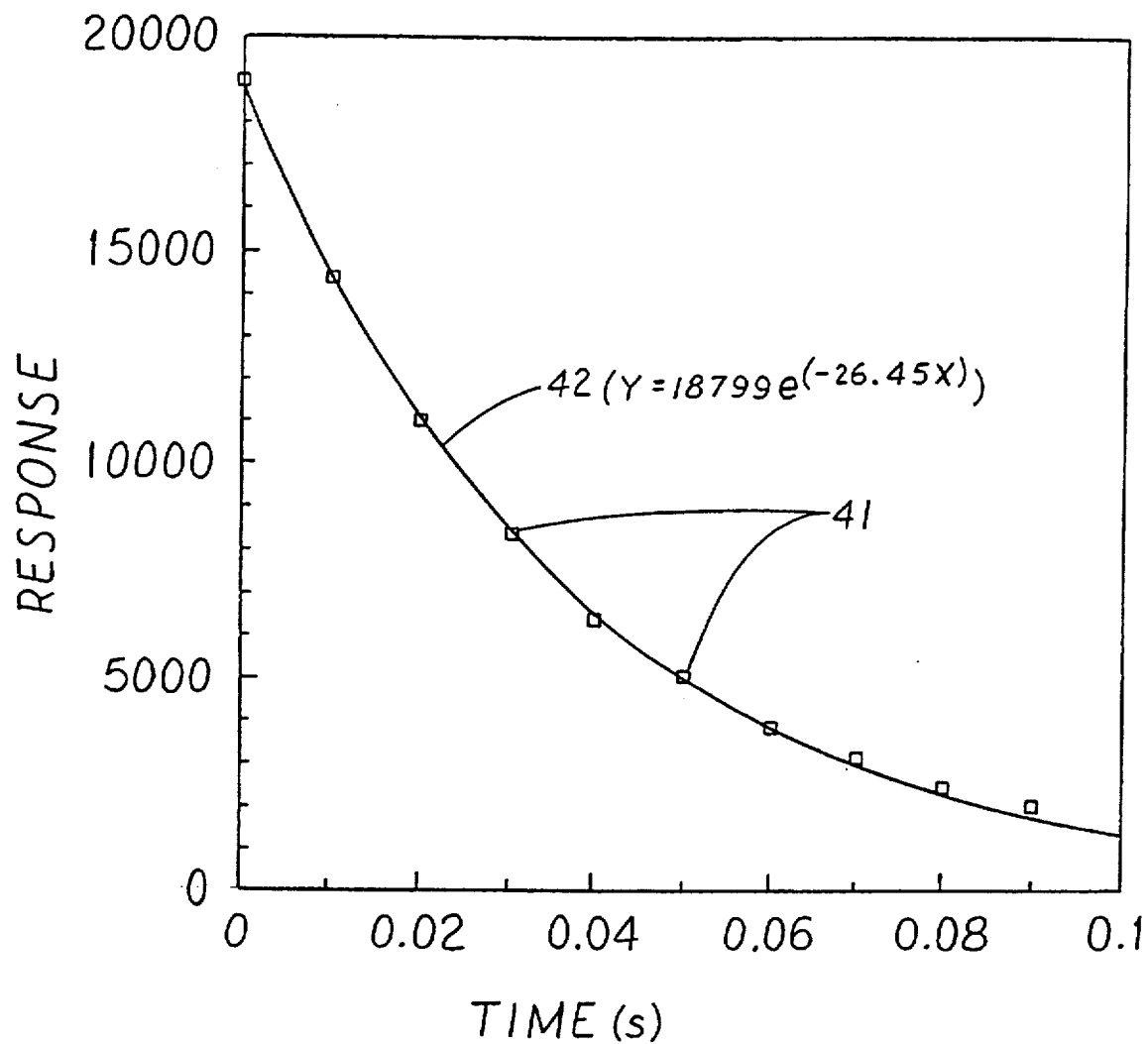
FIG. 4 is a graph of Response versus time for the short time constant decay of $Al_2O_3$.
Figure 5:
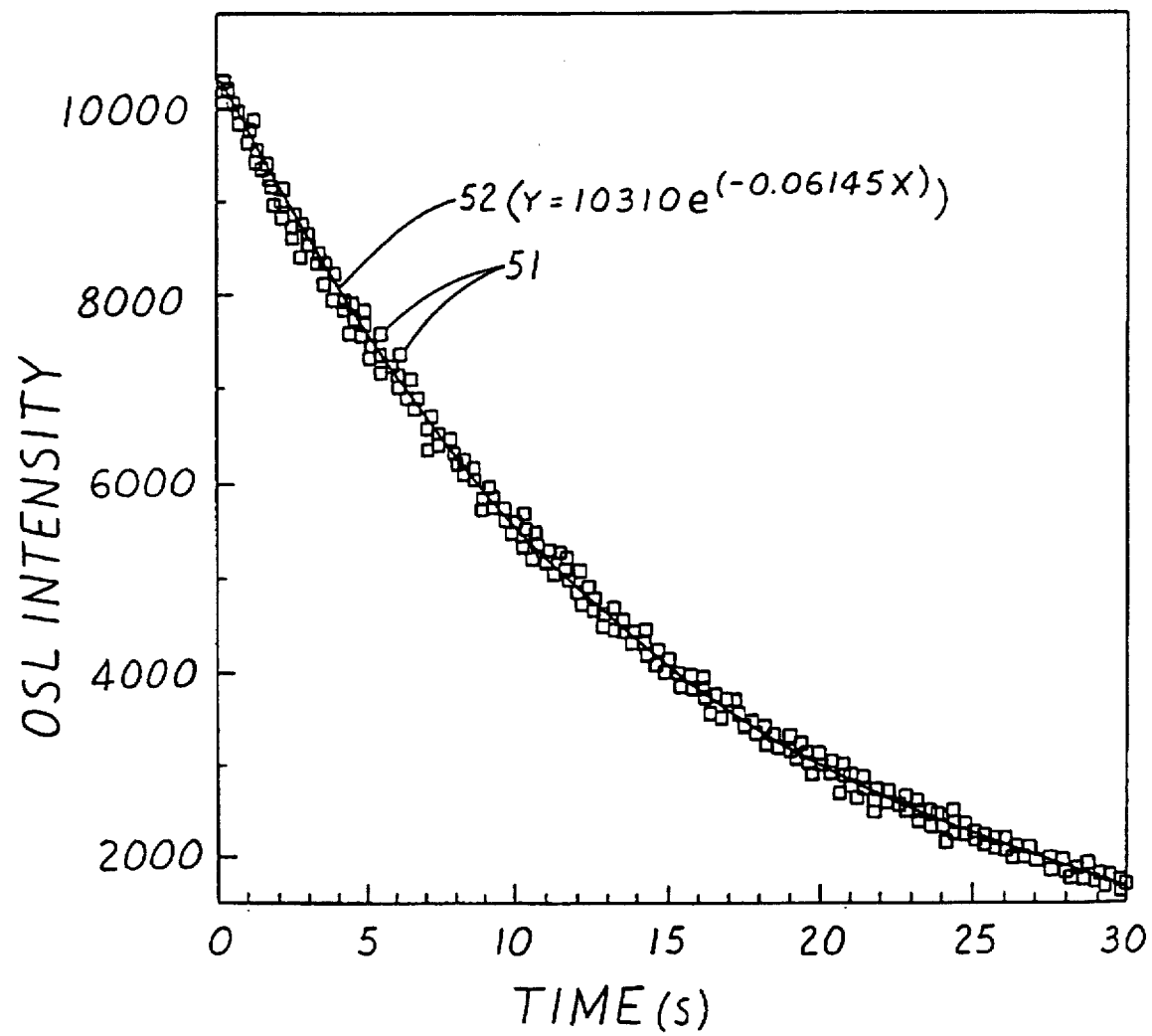
FIG. 5 is a graph of OSL Intensity versus time for the long time constant decay of $Al_2O_3$.

Results are shown in FIGS. 4 and 5 for a first luminescent center and a second luminescent center respectively. The first luminescent center data provided in FIG. 4 shows data points 41 of actual data and a first smooth fit line 42 through the data. Although short, the time of up to 0.1 seconds is sufficient to obtain a reading at room temperature which has significant advantages over readings required to be obtained at either high or low temperatures.

The second luminescent center data provided in FIG. 5 shows data points 51 of actual data and a second smooth fit line 52 through the data. This second luminescent center exhibits a much longer decay time than the first luminescent center.

EXAMPLE 3

An experiment was conducted to demonstrate the response versus wavelength behavior of sensitized aluminum oxide interrogated by the OSL method at room temperature.

Results are shown in Table 3.1.

TABLE 3.1

| OSL Response of $Al_2O_3$ | |
|---|---|
| Wavelength (nm) | Response (Counts) |
| 326 | 190 |
| 442 | 850 |
| 488 | 816 |
| 514 | 611 |
| 630 | 37 |

It was observed that the peak of greatest intensity occurred also between 400 nm and 520 nm, specifically at about 450 nm.

EXAMPLE 4

An experiment was conducted to identify polymers having low background for light at various wavelengths. Data for polymers exposed to 390 nm stimulation are given in Table 4.1.

TABLE 4.1

| Response of Polymers to 390 nm Light | |
|---|---|
| Polymer | Response (counts) |
| Polyethylene | 11.3 |
| Polyvinylchloride (PVC) | 10.9 |
| PMMA | 6.67 |
| Teflon | 5.1 |
| Urethane Acrylate | 500. |
| Fluroacrylates | 150–300 |

A similar test was performed but with wavelengths of 326 nm and wavelengths less than 326 nm with resulting background signals of 300 to 400 counts and in some instances, as high as 600 counts compared to the 11.3, etc. counts in Table 4.1. (The counts in Example 3 do not correspond to the counts in Example 4.)

A test exposing PMMA to blue light at 442 nm resulted in a background signal of about 5 counts, that is much quieter than the 390 nm exposure.

In addition, it was surprising to discover that the decay of the background signal from the plastic matrix was faster than the decay from the aluminum oxide material. This permits rapid reading within 30 seconds and preferably within about 1 or 2 seconds (FIG. 5) or within about 0.1 second (FIG. 4).

EXAMPLE 5

Figure 6:
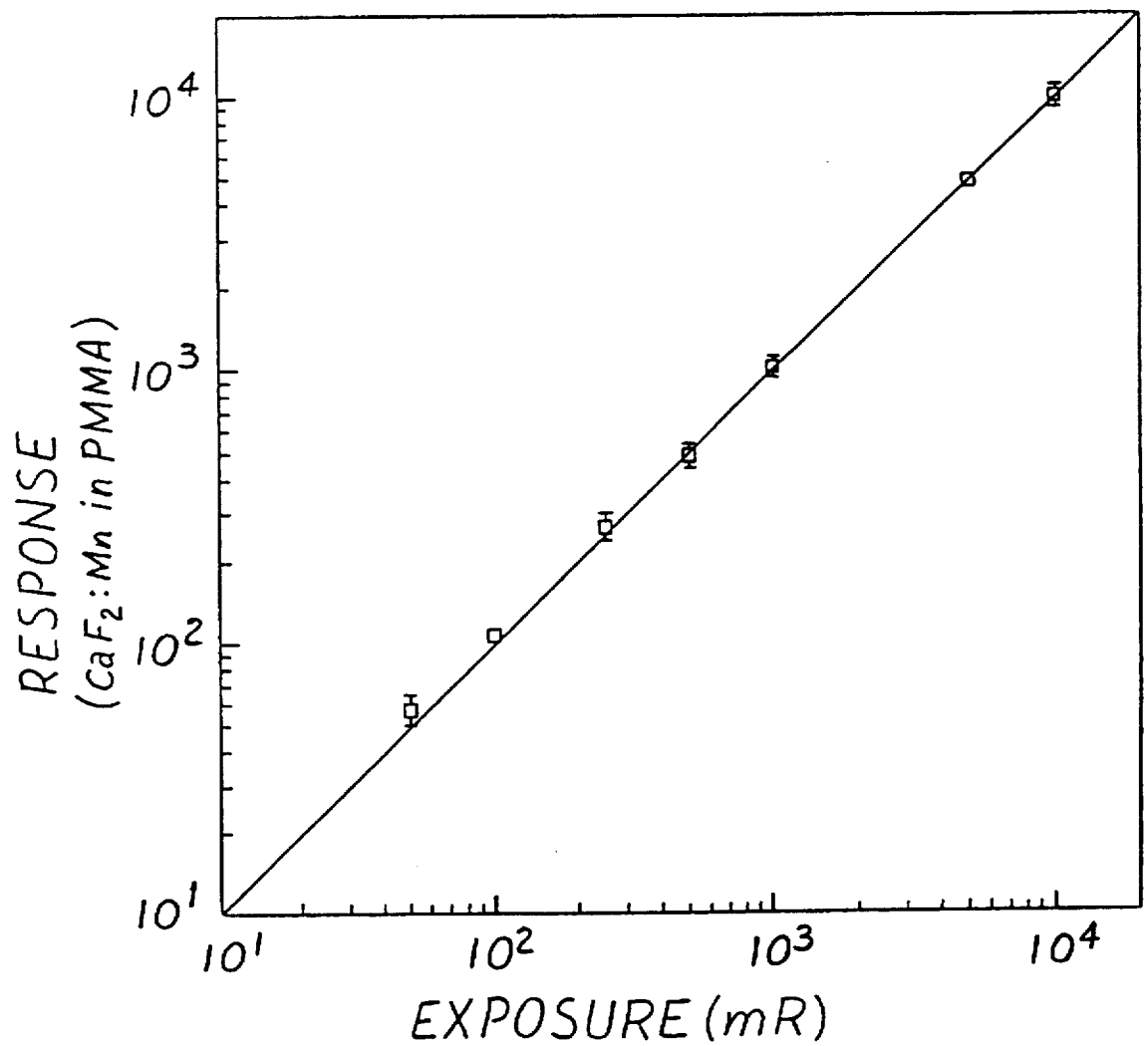
FIG. 6 is a graph of COSL response versus exposure for $CaF_2$:Mn in PMMA.

An experiment was conducted to demonstrate the response of calcium fluoride manganese ($CaF_2$:Mn) in PMMA. FIG. 6 shows response versus exposure obtained using the COSL process cooled with liquid nitrogen and a light source with bandpass filter producing light at 390 nm±10 nm.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A dosimeter for measuring radiation exposure, comprising:
   (a) a volume of an optically non-opaque polymer containing;
   (b) particles of bi-element dosimeter material exhibiting a luminescent response upon stimulation of visible light substantially free of ultraviolet light, the particles dispersed throughout the volume of the polymer, the amount of particles being such that when said dosimeter has been exposed to ionizing radiation and stimulated with a visible light beam substantially free of ultraviolet light, the particles emit photons in sufficient quantity so as to provide a measure of exposure to ionizing radiation.

2. The dosimeter as recited in claim 1, wherein the bi-element dosimeter material is selected from the group of alkali-metal fluorides.

3. The dosimeter as recited in claim 2, wherein the alkali-metal is selected from the group consisting of lithium and sodium.

4. The dosimeter as recited in claim 1, wherein the polymer is stress relieved poly-methyl-methacrylate.

5. The dosimeter as recited in claim 1, wherein the polymer has a visible light decay time of less than a visible light decay time of the bi-element material.

* * * * *